(12) United States Patent
Li

(10) Patent No.: US 11,126,037 B2
(45) Date of Patent: Sep. 21, 2021

(54) LIQUID CRYSTAL DISPLAY PANEL, DISPLAY DEVICE AND OPERATING METHOD THEREOF

(71) Applicant: BOE TECHNOLOGY GROUP CO., LTD., Beijing (CN)

(72) Inventor: Zhongxiao Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 28 days.

(21) Appl. No.: 16/643,315

(22) PCT Filed: Aug. 26, 2019

(86) PCT No.: PCT/CN2019/102533
§ 371 (c)(1),
(2) Date: Feb. 28, 2020

(87) PCT Pub. No.: WO2020/063231
PCT Pub. Date: Apr. 2, 2020

(65) Prior Publication Data
US 2021/0215977 A1 Jul. 15, 2021

(30) Foreign Application Priority Data
Sep. 26, 2018 (CN) .......................... 201811124486.4

(51) Int. Cl.
G02F 1/13357 (2006.01)
G02F 1/1335 (2006.01)

(52) U.S. Cl.
CPC .. *G02F 1/133621* (2013.01); *G02F 1/133504* (2013.01); *G02F 1/133514* (2013.01); *G02F 1/133528* (2013.01)

(58) Field of Classification Search
CPC ................................................ G02F 1/133621
See application file for complete search history.

(56) References Cited

U.S. PATENT DOCUMENTS

2002/0167619 A1 11/2002 Bietsch et al.
2009/0167981 A1* 7/2009 Arai .................. G02F 1/133606
349/62

(Continued)

FOREIGN PATENT DOCUMENTS

| CN | 106292049 A | 1/2017 |
| CN | 106681047 A | 5/2017 |

(Continued)

OTHER PUBLICATIONS

First Office Action for Chinese Application No. 201811124486.4, dated May 6, 2020, 9 Pages.

(Continued)

*Primary Examiner* — Edmond C Lau
(74) *Attorney, Agent, or Firm* — Brooks Kushman P.C.

(57) ABSTRACT

Liquid crystal display panel, display device, operating method are provided. Liquid crystal display panel includes: first substrate and opposite second substrate, where second substrate is on light exiting side of liquid crystal display panel; first electrode, second electrode, liquid crystal layer, between first substrate and second substrate; light extracting component on first substrate, for extracting polarized light propagated in totally reflected manner in first substrate; and filter layer on second substrate, including color filter unit corresponding to a color, where color filter unit is configured to transmit polarized light with the color and prevent transmission of polarized light with a color different from the color; first electrode and second electrode are for controlling deflection direction of liquid crystal molecules in liquid crystal layer in response to electrical signals applied to first and second electrodes, to control propagation direction of polarized light extracted by light extracting component.

20 Claims, 5 Drawing Sheets

(56) References Cited

U.S. PATENT DOCUMENTS

| | | |
|---|---|---|
| 2017/0090096 A1 | 3/2017 | Fattal |
| 2018/0188440 A1* | 7/2018 | Fattal .................. G02B 6/0068 |
| 2019/0094606 A1 | 3/2019 | Li et al. |
| 2019/0101797 A1 | 4/2019 | Wang et al. |
| 2019/0129082 A1 | 5/2019 | Li et al. |
| 2019/0324186 A1 | 10/2019 | Tan |
| 2019/0339566 A1 | 11/2019 | Tan et al. |

FOREIGN PATENT DOCUMENTS

| | | |
|---|---|---|
| CN | 107238974 A | 10/2017 |
| CN | 107402473 A | 11/2017 |
| CN | 107450211 A | 12/2017 |
| CN | 107817629 A | 3/2018 |
| CN | 108469703 A | 8/2018 |
| CN | 108572482 A | 9/2018 |
| CN | 109031770 A | 12/2018 |

OTHER PUBLICATIONS

International Search Report and Written Opinion for Application No. PCT/CN2019/102533, dated Nov. 15, 2019, 10 Pages.

* cited by examiner

LIQUID CRYSTAL DISPLAY PANEL, DISPLAY DEVICE AND OPERATING METHOD THEREOF

CROSS-REFERENCE TO RELATED APPLICATIONS

This application is the U.S. national phase of PCT Application No. PCT/CN2019/102533 filed on Aug. 26, 2019, which claims priority to Chinese Patent Application No. 201811124486.4 filed on Sep. 26, 2018, which are incorporated herein by reference in their entireties.

TECHNICAL FIELD

The present disclosure relates to the field of display technology, and in particular to a liquid crystal display panel, a display device and an operating method thereof.

BACKGROUND

Liquid crystal displays are display devices currently used in a large scale, which have a series of advantages such as high color gamut, lightness and thinness, and fast response, and have mature technologies in theoretical research and practical process. Liquid crystal displays can not only meet the needs of conventional display, but also have various different display modes, such as transparent display, peep-proof display and dual-view display.

In the related technologies, for transparent display, generally a transparent region in the display region is obtained through division, and transparent display is realized by using the transparent region to transmit the ambient light. Since polarizers are required on both the upper and lower surfaces of the liquid crystal display panel, the transmittance of the transparent region is low, and the arrangement of the transparent region affects the resolution of the display device, which is not conducive to achieving a high PPI (pixel density) of the display device.

SUMMARY

The present disclosure provides a liquid crystal display panel including:

a first substrate and a second substrate opposite to each other, where the second substrate is on a light exiting side of the liquid crystal display panel;

a first electrode, a second electrode, and a liquid crystal layer which are between the first substrate and the second substrate;

a light extracting component on the first substrate, configured to extract polarized light that is propagated in a totally reflected manner in the first substrate; and a filter layer on the second substrate, including a color filter unit corresponding to a color, where the color filter unit is configured to transmit polarized light with the color and prevent transmission of polarized light with a color which is different from the color;

where the first electrode and the second electrode are configured to control a deflection direction of liquid crystal molecules in the liquid crystal layer in response to electrical signals applied to the first electrode and the second electrode, to control a propagation direction of the polarized light extracted by the light extracting component.

Optionally, the first electrode and the second electrode are configured to control the deflection direction of the liquid crystal molecules in the liquid crystal layer in response to voltage signals applied to the first electrode and the second electrode, so as to control the polarized light to propagate to the color filter unit with the corresponding color for realizing bright state display or to control the polarized light to propagate to the color filter unit with another color for realizing dark state display.

Optionally, the light extracting component includes:

a first light extracting grating configured to extract first monochromatic light that is propagated in a totally reflected manner in the first substrate;

a second light extracting grating configured to extract second monochromatic light that is propagated in a totally reflected manner in the first substrate; and a third light extracting grating configured to extract third monochromatic light that is propagated in a totally reflected manner in the first substrate;

where the first light extracting grating, the second light extracting grating, and the third light extracting grating have different periods, and the first monochromatic light, the second monochromatic light, and the third monochromatic light are capable of being mixed into white light.

Optionally, the filter layer includes a first color sub-pixel configured to transmit the first monochromatic light, a second color sub-pixel configured to transmit the second monochromatic light, and a third color sub-pixel configured to transmit the third monochromatic light, the first light extracting grating corresponds to at least one first color sub-pixel, the second light extracting grating corresponds to at least one second color sub-pixel, and the third light extracting grating corresponds to at least one third color sub-pixel.

Optionally, the light extracting component includes:

a fourth light extracting grating, configured to extract first monochromatic light, second monochromatic light, and third monochromatic light that are propagated in a totally reflected manner in the first substrate, where the first monochromatic light, the second first monochromatic light and the third monochromatic light are capable of being mixed into white light.

Optionally, the liquid crystal display panel further includes:

a first alignment layer on a side of the first substrate facing the second substrate; and a second alignment layer on a side of the second substrate facing the first substrate.

Optionally, an orthographic projection of a long axis of liquid crystal molecules in the liquid crystal layer onto the first substrate is parallel to a vibration direction of the polarized light propagating in the liquid crystal layer.

Optionally, the light extracting component is on a surface on a side of the first substrate close to the second substrate.

Optionally, the light extracting component is on a surface on a side of the first substrate away from the second substrate.

Optionally, the first color sub-pixel is configured to absorb the second monochromatic light and the third monochromatic light to prevent transmission of the second monochromatic light and the third monochromatic light;

the second color sub-pixel is configured to absorb the first monochromatic light and the third monochromatic light to prevent transmission of the first monochromatic light and the third monochromatic light; and the third color sub-pixel is configured to absorb the first monochromatic light and the second monochromatic light to prevent transmission of the first monochromatic light and the second monochromatic light.

The present disclosure also provides a display device, including:

the liquid crystal display panel as described above;

a light source on a light incident side of the first substrate of the liquid crystal display panel; and;

an optical coupling component, configured to convert light emitted by the light source into collimated polarized light, and enable the collimated polarized light to enter the first substrate at a preset angle, so that the polarized light propagates in the first substrate in a totally reflected manner.

Optionally, the optical coupling component includes:

a coupling lampshade, configured to change a propagation direction of the light emitted by the light source, so that the light enters the first substrate at the preset angle to propagate in a totally reflected manner in the first substrate; and a polarizer on a light exiting side of the coupling lampshade or the light incident side of the first substrate, configured to convert the light into the polarized light.

Optionally, the light source is a white light source.

Optionally, the light source includes a first monochromatic light source, a second monochromatic light source, and a third monochromatic light source, the first monochromatic light source is configured to emit first monochromatic light, the second monochromatic light source is configured to emit second monochromatic light, the third monochromatic light source is configured to emit third monochromatic light, the first monochromatic light, the second monochromatic light, and the third monochromatic light are capable of being mixed into white light, and the light source is configured to sequentially emit the first monochromatic light, the second monochromatic light, and the third monochromatic light in three display time periods of a frame.

The present disclosure also provides an operating method for a display device, which is applied to the display device as described above, and the operating method includes:

applying electrical signals to the first electrode and the second electrode, so that the liquid crystal molecules are deflected, and a propagation direction of the polarized light extracted by the light extracting component is changed.

Optionally, the light extracting component includes:

a first light extracting grating configured to extract first monochromatic light that is propagated in a totally reflected manner in the first substrate;

a second light extracting grating configured to extract second monochromatic light that is propagated in a totally reflected manner in the first substrate;

a third light extracting grating configured to extract third monochromatic light that is propagated in a totally reflected manner in the first substrate; and where the first light extracting grating, the second light extracting grating, and the third light extracting grating have different periods, the first monochromatic light, the second monochromatic light, and the third monochromatic light are capable of being mixed into white light, the light source is a white light source, and the operating method includes:

applying the electrical signals on the first electrode and the second electrode to deflect the liquid crystal molecules so as to change a propagation direction of the first monochromatic light extracted by the first light extracting grating;

applying the electrical signals on the first electrode and the second electrode to deflect the liquid crystal molecules so as to change a propagation direction of the second monochromatic light extracted by the second light extracting grating; and applying the electrical signals to the first electrode and the second electrode to deflect the liquid crystal molecules so as to change a propagation direction of the third monochromatic light extracted by the third light extracting grating.

Optionally, the light extracting component includes: a fourth light extracting grating configured to extract first monochromatic light, second monochromatic and third monochromatic light which are propagated in a totally reflected manner in the first substrate, the first monochromatic light, the second monochromatic light, and the third monochromatic light are capable of being mixed into white light, the light source is configured to sequentially emit the first monochromatic light, the second monochromatic light, and the third monochromatic light, and the operating method includes:

in a first stage of each display time period, controlling the light source to emit the first monochromatic light, and applying electrical signals to the first electrode and the second electrode, so that the liquid crystal molecules are deflected, and a propagation direction of the first monochromatic light extracted by the fourth light extracting grating is changed;

in a second stage of each display time period, controlling the light source to emit the second monochromatic light, and applying electrical signals to the first electrode and the second electrode, so that the liquid crystal molecules are deflected, and a propagation direction of the second monochromatic light extracted by the fourth light extracting grating is changed; and s;

in a third stage of each display time period, controlling the light source to emit the third monochromatic light, and applying electrical signals to the first electrode and the second electrode, so that the liquid crystal molecules are deflected, and a propagation direction of the third monochromatic light extracted by the fourth light extracting grating is changed.

DETAILED DESCRIPTION

Figure 1:
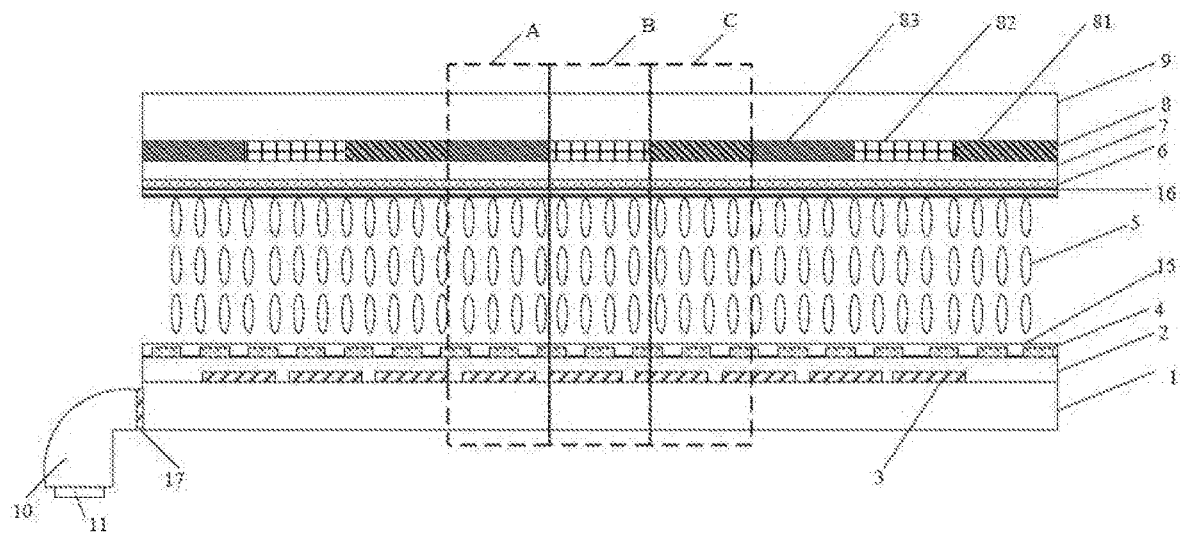
FIG. 1 is a schematic structural diagram of a display device according to some embodiments of the present disclosure.

In order to make technical problems, technical solutions, and advantages of the embodiments of the present disclosure clearer, descriptions will be provided in detail with reference to the accompanying drawings and specific embodiments hereinafter.

Embodiments of the present disclosure provide a liquid crystal display panel, a display device, and an operating method thereof, which can improve transmittance and PPI of a display device.

Some embodiments of the present disclosure provide a liquid crystal display panel, including:

a first substrate and a second substrate which are opposite to each other, and the second substrate is located on a light exiting side of the liquid crystal display panel;

a first electrode, a second electrode, and a liquid crystal layer which are located between the first substrate and the second substrate.

The liquid crystal display panel further includes:

a light extracting component disposed on a light exiting side of the first substrate or on a side opposite to the light exiting side, and configured to extract polarized light that is propagated in a totally reflected manner in the first substrate; and a filter layer provided on the second substrate, including multiple color filter units with different colors, where the color filter unit with each color only allow polarized light with the corresponding color to pass through;

where the liquid crystal layer is configured such that liquid crystal molecules in the liquid crystal layer are deflected to control a propagation direction of polarized light extracted by the light extracting component under the action of an electric field between the first electrode and the second electrode.

In some embodiments of the present disclosure, polarized light is propagated in a totally reflected manner in the first substrate, the polarized light propagated in a totally reflected manner in the first substrate is extracted by the light extracting component disposed on the light exiting side of the first substrate, the liquid crystal molecules are controlled to be deflected so as to control the propagation direction of the polarized light extracted by the light extracting component, and when the extracted polarized light irradiates the color filter unit with the same color as the polarized light, gray level display is achieved; and when the extracted polarized light irradiates the color filter unit with a color different from that of the polarized light, dark state display is realized. The technical solution of the present disclosure is to implement gray level display by changing the propagation direction of the polarized light, instead of realizing gray level display by modulating polarized light. Therefore, there is no need to provide a polarizer on the light exiting side of the liquid crystal display panel. In addition, since the polarized light is transmitted in a totally reflected manner in the first substrate, instead of exiting through the first substrate, there is no need to provide a polarizer on the surface of the first substrate to convert natural light into polarized light. In summary, there is no need to provide polarizers on surfaces of the two substrates of the liquid crystal display panel.

A polarizer can control the polarization direction of a specific light beam. When natural light passes through the polarizer, the light whose vibration direction is perpendicular to the transmission axis of the polarizer will be absorbed, and only the polarized light whose vibration direction is parallel to the transmission axis of the polarizer will be transmitted. In the related technologies, two polarizers are attached to the light exiting side and the light incident side of the liquid crystal display panel respectively. The lower polarizer is configured to convert the light beam generated by the backlight into polarized light, and the upper polarizer is configured to parse the polarized light on which liquid crystal electrical modulation has been performed, to produce a contrast between bright and dark, thereby producing a display image. Compared with the related technologies, in the embodiments of the present disclosure, there is no need to provide polarizers on the surfaces of the two substrates of the liquid crystal display panel, so that the transmittance of the liquid crystal display panel can be improved. Furthermore, the technical solutions of the present disclosure do not use transparent region to transmit ambient light to achieve transparent display, therefore, no transparent region may be provided in sub-pixels, which is beneficial to achieving a high PPI of the display device.

The first electrode and the second electrode may be located on the same side of the liquid crystal layer or on different sides of the liquid crystal layer. The liquid crystal layer is configured to be equivalent to a liquid crystal prism under the action of an electric field between the first electrode and the second electrode. By controlling the polarized light to propagate to the color filter unit with a corresponding color, bright state display is realized, or, by controlling the polarized light to propagate to the color filter unit with another color, dark state display is realized.

The light extracting component may be a light extracting grating. The light extracting component is not limited to the light extracting grating, and other light extracting devices may be used, as long as that the propagation state of the polarized light that is propagated in a totally reflected manner in the first substrate can be changed to allow the polarized light to exit.

The light extracting component may include two types of light extracting gratings. One type of light extracting grating may extract polarized light in a specific wavelength range, and the other type of light extracting grating may extract all visible light.

When the light extracting grating can only extract polarized light in a specific wavelength range, the light extracting component includes:

a first light extracting grating, capable of extracting first monochromatic light that is propagated in a totally reflected manner in the first substrate;

a second light extracting grating, capable of extracting second monochromatic light that is propagated in a totally reflected manner in the first substrate; and a third light extracting grating, capable of extracting third monochromatic light that is propagated in a totally reflected manner in the first substrate.

The first light extracting grating, the second light extracting grating, and the third light extracting grating have different periods. By designing the periods of the light extracting gratings, the light extracting gratings can extract monochromatic lights with different colors. The first monochromatic light, the second monochromatic light, and the third monochromatic light can be mixed into white light.

Optionally, the liquid crystal display panel includes a first color sub-pixel emitting first monochromatic light, a second color sub-pixel emitting second monochromatic light, and a third color sub-pixel emitting third monochromatic light. The first light extracting grating corresponds to at least one first color sub-pixel, the second light extracting grating corresponds to at least one second color sub-pixel, and the third light extracting grating corresponds to at least one third color sub-pixel.

When the light extracting grating can extract all visible light, the light extracting component includes:

a forth light extracting grating, capable of extracting first monochromatic light, second monochromatic light, the third monochromatic light that are propagated in a totally reflected manner in the first substrate, where the first monochromatic light, the second monochromatic light and the third monochromatic light can be mixed into white light.

Optionally, the liquid crystal display panel further includes:

a first alignment layer on a side of the first substrate facing the second substrate; and a second alignment layer on a side of the second substrate facing the fast substrate. The first alignment layer and the second alignment layer are aligned in parallel, so that: in the initial alignment, the long axis of the liquid crystal molecules in the liquid crystal layer is parallel to the vibration direction of the polarized light propagating in the liquid crystal layer, and after the liquid crystal molecules are deflected, the orthographic projection of the liquid crystal molecules onto the first substrate is still parallel to the vibration direction of the polarized light propagating in the liquid crystal layer.

Some embodiments of the present disclosure further provide a display device, including:

the liquid crystal display panel as described above;

a light source disposed on a light incident side of the first substrate of the liquid crystal display panel;

an optical coupling component, configured to convert light emitted by the light source into collimated polarized light and enable the collimated polarized light to enter the first substrate at a preset angle, so that the polarized light is propagated in a totally reflected manner in the first substrate.

The display device may be any product or component having a display function, such as a liquid crystal television, a liquid crystal display, a digital photo frame, a mobile phone, and a tablet computer. The display device further includes a flexible circuit board, a printed circuit board, and a backboard.

Optionally, the optical coupling component includes:

a coupling lampshade, configured to change a propagation direction of the light emitted by the light source, so that the light enters the first substrate at the preset angle to propagate in a totally reflected manner in the first substrate; and a polarizer, disposed on a light exiting side of the coupling lampshade or the light incident side of the first substrate, and configured to convert the light into the polarized light.

Optionally, the light source may be a white light source; or, the light source may include a first monochromatic light source, a second monochromatic light source, and a third monochromatic light source, and the first monochromatic light, the second monochromatic light source and the third monochromatic light can be mixed into white light.

FIG. 1 is a schematic structural diagram of a display device in some embodiments of the present disclosure. As shown in FIG. 1, the display device includes a first substrate 1 and a second substrate 9. A white light source 11 emits white light, which enters, via a coupling lampshade 10, the first substrate 1 in a collimated manner, and propagates in a totally reflected manner in the first substrate 1. A polarizer 17 is provided on the light incident side of the first substrate 1 or the light exiting surface of the coupling lampshade 10 to convert light into polarized light. A light extracting grating 3 is provided on the light exiting side of the first substrate 1. The light extracting gratings 3 with different periods are designed for sub-pixels with different colors, so that the light extracting grating 3 extract monochromatic lights in specific wavelength ranges according to the different periods. Specifically, the light extracting grating 3 may include three types of light extracting gratings, which can respectively extract red light, blue light, and green light.

An insulating layer 2 covering the light extracting gratings 3 is provided on the first substrate 1, and a first electrode 4 is provided on the insulating layer 2. The insulating layer 2 may also have a function of planarization. Specifically, the first electrode 4 may be a strip electrode; a filter layer 8 is provided on a surface of the second substrate 9 facing the first substrate 1, and the filter layer 8 includes a red filter unit 81, a green filter unit 82, and a blue filter unit 83. The second substrate 9 is further provided with a planarization layer 7 covering the filter layer 8. The planarization layer 7 is configured to flatten the step of the filter layer 8. A second electrode 6 is provided on the planarization layer 7. Specifically, the second electrode 6 may be a planar electrode; a second alignment layer 16 is further provided on a side of the second electrode 6 facing the first electrode 4, and a first alignment layer 15 is further provided on a side of the first electrode 4 facing the second electrode 6. A liquid crystal layer 5 is provided between the first electrode 4 and the second electrode 6, and the upper and lower surfaces of the liquid crystal layer are oriented in parallel so that the long axis direction of the liquid crystal molecules is parallel to the vibration direction of the polarized light. The liquid crystal molecules in the liquid crystal layer 5 may be deflected under the action of the electric field between the first electrode 4 and the second electrode 6.

Figure 2:
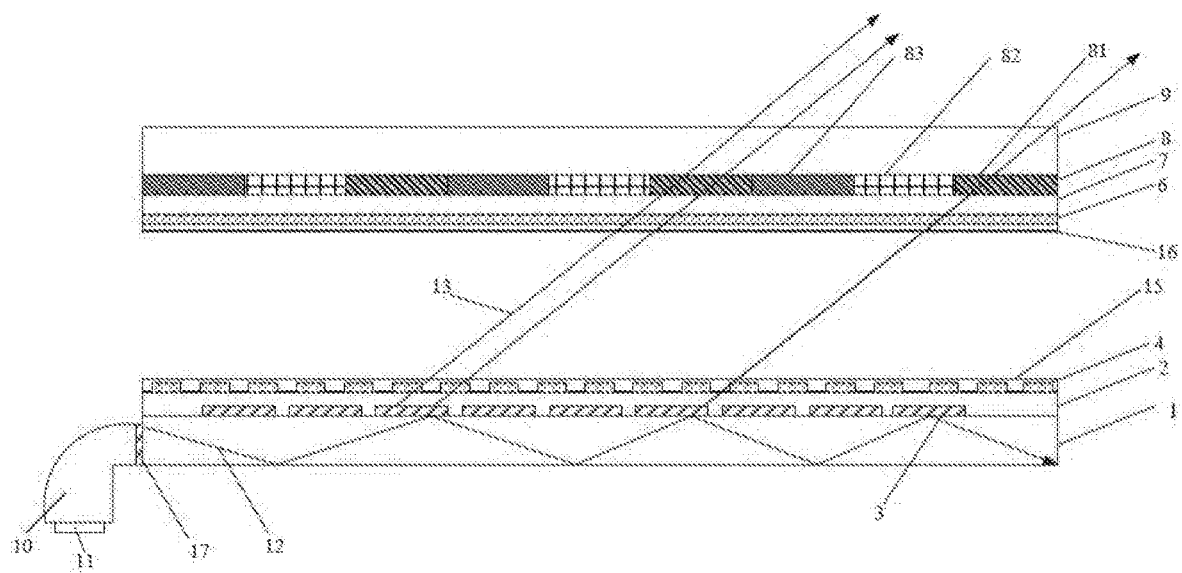
FIG. 2 is a schematic diagram of gray level display of a display device according to some embodiments of the present disclosure.
Figure 4:
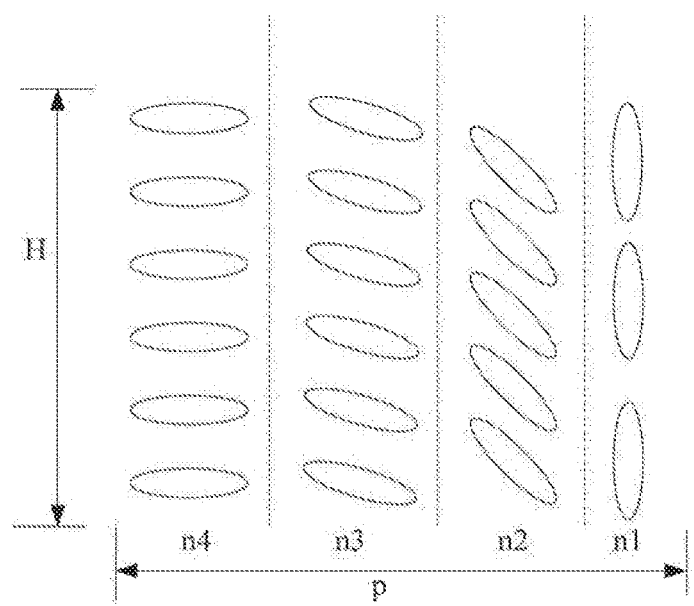
FIG. 4 is a schematic diagram of liquid crystal deflection of a display device according to some embodiments of the present disclosure.
Figure 5:
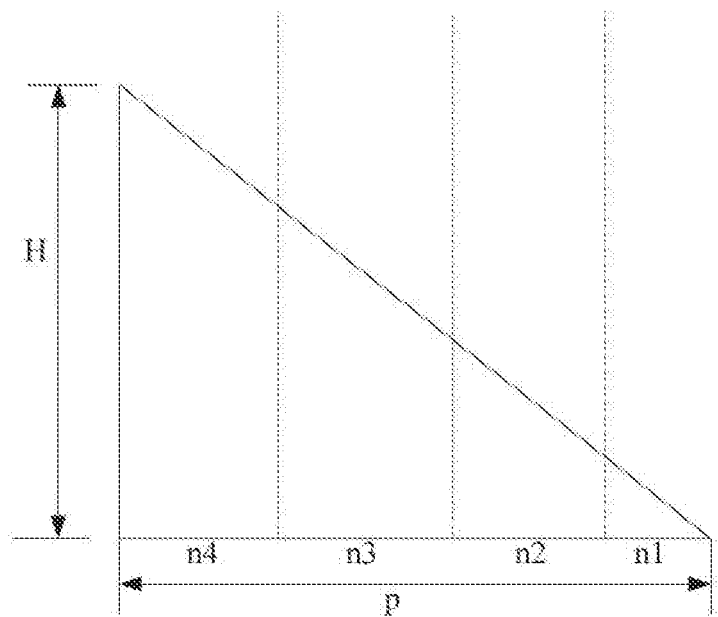
FIG. 5 is a schematic diagram of an equivalent prism of a liquid crystal layer according to some embodiments of the present disclosure.

As shown in FIG. 1, the red filter unit 81, the green filter unit 82, and the blue filter unit 83 correspond to the red sub-pixel A, the green sub-pixel B. and the blue sub-pixel C, respectively. The display of the red sub-pixel A is taken as an example for illustration. As shown in FIG. 2, after the white light source 11 emits white light 12, the white light 12 is converted into collimated polarized light through the action of the coupling lampshade 10 and enters the first substrate 1 to propagate in a totally reflected manner in the substrate 1. When the white light 12 meets the light extracting grating 3, a part of the light is extracted into the liquid crystal layer 5 at a certain angle, according to the light extracting efficiency of the light extracting grating 3. The first substrate 1 is provided with the light extracting grating 3 capable of extracting the red light 13. After the light extracting grating 3 extracts the red light 13, the red light 13 enters the liquid crystal layer 5. Electrical signals applied to the first electrode 4 and the second electrode 6 are controlled, to enable the liquid crystal molecules in the liquid crystal layer to be deflected, which can be equivalent to an oblique prism, so that the propagation direction of the red light 13 can be controlled. The liquid crystal layer may be divided into multiple independently controlled liquid crystal units. Each liquid crystal unit shown in FIG. 4 can be equivalent to an oblique prism structure shown in FIG. 5, where R is the height of the liquid crystal unit, P is the length of the liquid crystal unit and, n1-n4 are the refractive indexes of different parts of the liquid crystal unit. When different electric fields are applied to liquid crystal molecules in different regions, the deflection angles of the liquid crystal molecules are different, and the refractive indexes are also different. As a result, the entire optical path difference distribution is the same as the optical path difference distribution of the oblique prism, and its optical effect is equivalent to the oblique prism structure, which has the function of deflecting light angle.

As shown in FIG. 2, by controlling the electrical signals applied to the first electrode 4 and the second electrode 6, the propagation direction of the red light 13 is deflected, and the red light 13 irradiates the red filter unit 81, then the red light 13 may exit through the red filter unit 81 and enter the environment to realize bright state display of the red sub-pixel.

Figure 3:
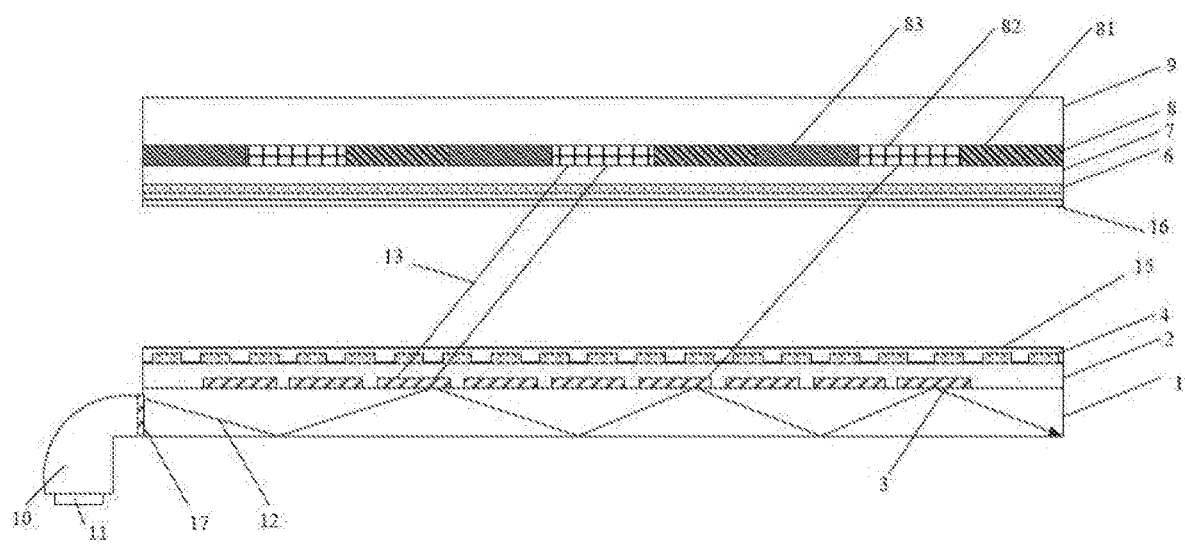
FIG. 3 is a schematic diagram of dark state display of a display device according to some embodiments of the present disclosure.

As shown in FIG. 3, by controlling the electrical signals applied to the first electrode 4 and the second electrode 6, the propagation direction of the red light 13 is deflected, and the red light 13 irradiates the green filter unit 82, then the red light 13 is absorbed by the green filter unit 82, and no red light 13 is emitted in this case, which realizes dark state display of the red sub-pixel. Similarly, by controlling the electrical signals applied to the first electrode 4 and the second electrode 6, the propagation direction of the red light 13 is deflected, and the red light 13 irradiates the blue filter unit 83, then the red light 13 is also absorbed by the blue filter unit 83, no red light 13 is emitted in this case, and dark state display of the red sub-pixel is achieved.

When implementing the intermediate gray level display, by controlling the electrical signals applied to the first electrode 4 and the second electrode 6, part of the red light 13 irradiates the red filter unit 81, and part of the red light 13 irradiates the blue filter unit 83 and the green filter unit 82. The more the red light 13 irradiating the red filter unit 81 is, the greater the brightness of the red sub-pixel is.

The display process of the blue sub-pixel and the green sub-pixel uses the same display principle as the display process of the red sub-pixel, which is not repeated here.

Figure 6:
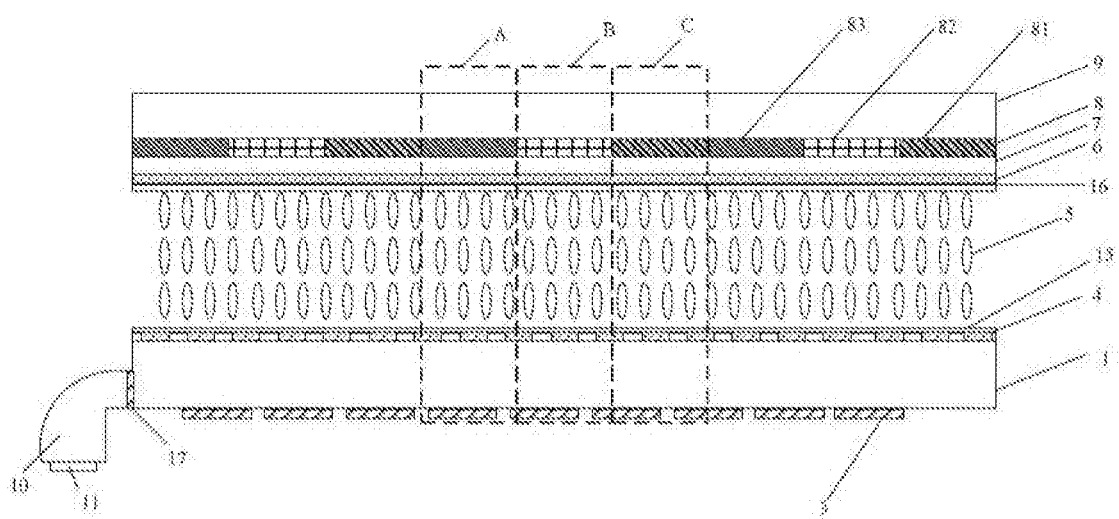
FIG. 6 is a schematic structural diagram of a display device according to some embodiments of the present disclosure.

FIG. 6 is a schematic structural diagram of a display device in some embodiments of the present disclosure. As shown in FIG. 6, the display device includes a first substrate 1 and a second substrate 9. A white light source 11 emits white light, which enters, via a coupling lampshade 10, the first substrate 1 in a collimated manner, and propagates in a totally reflected manner in the first substrate 1. A polarizer 17 is provided on the light incident side of the first substrate 1 or the light exiting surface of the coupling lampshade 10 to convert light into polarized light. A light extracting grating 3 is provided on the opposite side of the light exiting side of the first substrate 1. The light extracting gratings 3 with different periods are designed for sub-pixels with different colors, so that the light extracting grating 3 extract monochromatic lights in specific wavelength ranges according to different periods. Specifically, the light extracting gratings 3 may include three types of light extracting gratings, which may respectively extract red light, blue light, and green light.

A first electrode 4 is disposed on the first substrate 1. Specifically, the first electrode 4 may be a strip electrode. A filter layer 8 is disposed on a surface of the second substrate 9 facing the first substrate 1. The filter layer 8 includes a red filter unit 81, a green filter unit 82, and a blue filter unit 83. The second substrate 9 is further provided with a planarization layer 7 covering the filter layer 8. The planarization layer 7 is used for flattening the step of the filter layer 8. A second electrode 6 is provided on the planarization layer 7. Specifically, the second electrode 6 may be a planar electrode. A second alignment layer 16 is provided on a side of the second electrode 6 facing the first electrode 4. A first alignment layer 15 is provided on a side of the first electrode 4 facing the second electrode 6. A liquid crystal layer 5 is provided between the first electrode 4 and the second electrode 6, and the upper and lower surfaces of the liquid crystal layer are oriented in parallel so that the long axis direction of the liquid crystal molecules is parallel to the vibration direction of the polarized light. The liquid crystal molecules in the liquid crystal layer 5 may be deflected under the action of the electric field between the first electrode 4 and the second electrode 6.

Figure 7:
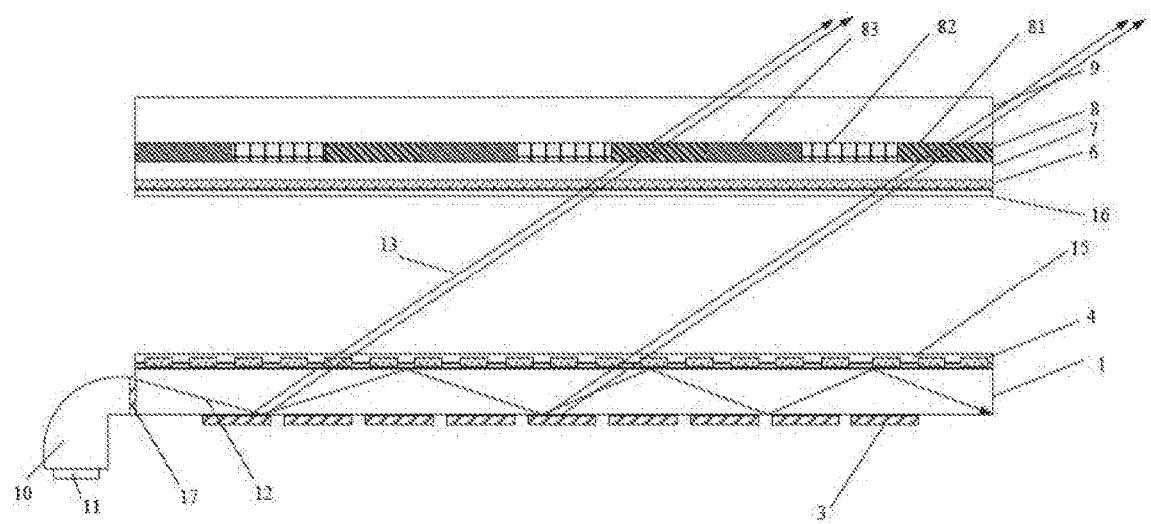
FIG. 7 is a schematic diagram of gray level display of a display device according to some embodiments of the present disclosure.

As shown in FIG. 6, the red filter unit 81, the green filter unit 82, and the blue filter unit 83 correspond to the red sub-pixel A, the green sub-pixel B, and the blue sub-pixel C, respectively. The display of the red sub-pixel A is taken as an example for illustration. As shown in FIG. 7, a white light source 11 emits white light 12, which is converted into collimated light under the action of a coupling lampshade 10 and enters the first substrate 1, and propagates in a totally reflected manner in the first substrate 1. When the white light 12 meets the light extracting grating 3, according to the light extracting efficiency of the light extracting grating 3, a part of the light is extracted into the liquid crystal layer 5 at a certain angle. The first substrate 1 is provided with the light extracting grating 3 capable of extracting the red light 13. After the light extracting grating 3 extracts the red light 13, the red light 13 enters the liquid crystal layer 5. The electrical signals applied to the first electrode 4 and the second electrode 6 are controlled, to enable the liquid crystal molecules in the liquid crystal layer to be deflected, which can be equivalent to an oblique prism, thereby controlling the propagation direction of the red light 13. The liquid crystal layer may be divided into multiple independently controlled liquid crystal units. Each liquid crystal unit shown in FIG. 4 can be equivalent to an oblique prism structure shown in FIG. 5, where H is the height of the liquid crystal unit, P is the length of the liquid crystal unit, and n1-n4 are the refractive indexes of different parts of the liquid crystal unit. When different electric fields are applied to liquid crystal molecules in different regions, the deflection angles of the liquid crystal molecules are different, and the refractive indexes are also different. As a result, the entire optical path difference distribution is the same as the optical path difference distribution of the oblique prism, and its optical effect is equivalent to the oblique prism structure, which has the function of deflecting light angle.

As shown in FIG. 7, by controlling the electrical signals applied to the first electrode 4 and the second electrode 6, the propagation direction of the red light 13 is deflected, and the red light 13 irradiates the red filter unit 81, then the red light 13 may be emitted through the red filter unit 81 and enter the environment to realize bright state display of the red sub-pixel.

Figure 8:
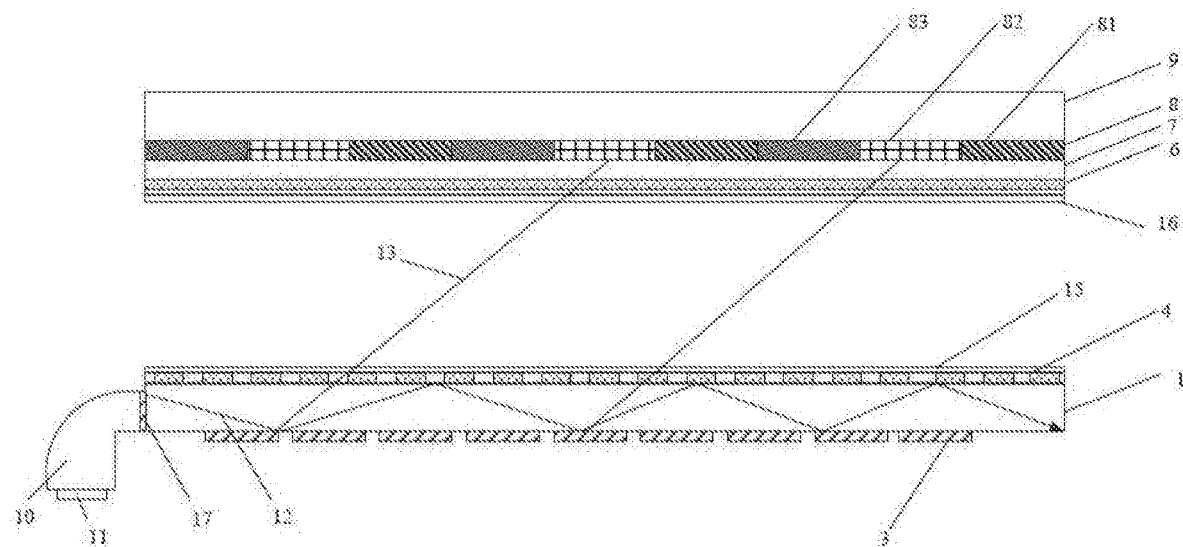
FIG. 8 is a schematic diagram of dark state display of a display device according to some embodiments of the present disclosure.

As shown in FIG. 8, by controlling the electrical signals applied to the first electrode 4 and the second electrode 6, the propagation direction of the red light 13 is deflected, and the red light 13 irradiates the green filter unit 82, then the red light 13 is absorbed by the green filter unit 82, and no red light 13 is emitted in this case, which realizes dark state display of the red sub-pixel. Similarly, by controlling the electrical signals applied to the first electrode 4 and the second electrode 6, the propagation direction of the red light 13 is deflected, and the red light 13 irradiates the blue filter unit 83, then the red light 13 is also absorbed by the blue filter unit 83, and no red light 13 is emitted in this case, which realizes dark state display of the red sub-pixel.

When implementing the intermediate gray level display, by controlling the electrical signals applied to the first electrode 4 and the second electrode 6, part of the red light 13 irradiates the red filter unit 81, and part of the red light 13 irradiates the blue filter unit 83 and the green filter unit

82. The more the red light 13 irradiating the red filter unit 81 is, the greater the brightness of the red sub-pixel is.

The display process of the blue sub-pixel and the green sub-pixel uses the same display principle as the display process of the red sub-pixel, which is not repeated herein.

By designing the positions of the light extracting grating 3 and the filter units in the filter layer 8, the display device in the embodiments may be in a normally white display mode or a normally black display mode. When the display device is in a normally white display mode, and when no electrical signal is applied to the first electrode 4 and the second electrode 6, the red light extracted by the light extracting grating 3 may irradiate the red filter unit 81, the green light extracted by the light extracting grating 3 may irradiate the green filter unit 82, and the blue light extracted by the light extracting grating 3 may irradiate the blue filter unit 83. When the display device is in a normally black display mode, and when no electrical signal is applied to the first electrode 4 and the second electrode 6, the red light extracted by the light extracting grating 3 may irradiate the green filter unit 82 and/or the blue filter unit 83, the green light extracted by the light extracting grating 3 may irradiate the blue filter unit 83 and/or the red filter unit 81, and the blue light extracted by the light extracting grating 3 may irradiate the red filter unit 81 and/or the green filter unit 82. The display principles of the normally white display mode and the normally black display mode are the same, where the difference lies in the positional relationship of the light extracting grating 3 and the filter units in the filter layer 8.

Figure 9:
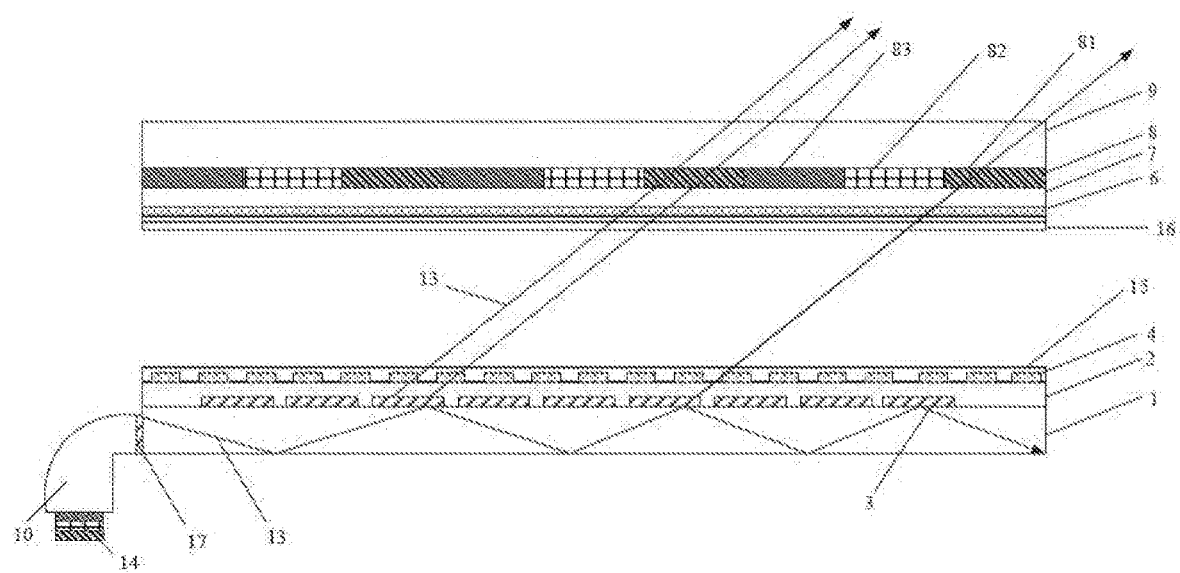
FIG. 9 is a schematic diagram of gray level display of a display device according to some embodiments of the present disclosure.

FIG. 9 is a schematic structural diagram of a display device in some embodiments of the present disclosure. As shown in FIG. 9, the display device includes a first substrate 1 and a second substrate 9. The light source 14 with three colors of red, green, and blue may sequentially emit red, green, and blue lights, which enter, via a coupling lampshade 10, the first substrate 1 in a collimated manner, and propagates in a totally reflected manner in the first substrate 1. A polarizer 17 is provided on the light incident side of the first substrate 1 or the light exiting surface of the coupling lampshade 10 to convert light into polarized light. A light extracting grating 3 is provided on the light exiting side of the first substrate 1. Different from the light extracting grating 3 shown in FIG. 1, in this embodiment, only one type of light extracting grating is designed. The light extracting grating 3 may extract visible light with any color.

An insulating layer 2 covering the light extracting grating 3 is provided on the first substrate 1, and a first electrode 4 is provided on the insulating layer 2. The insulating layer 2 may also have a function of planarization. Specifically, the first electrode 4 may be a strip electrode; a filter layer 8 is provided on a surface of the second substrate 9 facing the first substrate 1, and the filter layer 8 includes a red filter unit 81, a green filter unit 82, and a blue filter unit 83. The second substrate 9 is further provided with a planarization layer 7 covering the filter layer 8. The planarization layer 7 is configured to flatten the step of the filter layer 8. A second electrode 6 is provided on the planarization layer 7. Specifically, the second electrode 6 may be a planar electrode; in practical applications, a second alignment layer 16 is provided on a side of the second electrode 6 facing the first electrode 4, and a first alignment layer 15 is provided on a side of the first electrode 4 facing the second electrode 6. A liquid crystal layer 5 is provided between the first electrode 4 and the second electrode 6, and the upper and lower surfaces of the liquid crystal layer are oriented in parallel so that the long axis direction of the liquid crystal molecules is parallel to the vibration direction of the polarized light. The liquid crystal molecules in the liquid crystal layer 5 may be deflected under the action of the electric field between the first electrode 4 and the second electrode 6.

Take the display of the red sub-pixel as an example for illustration. As shown in FIG. 9, the light source 14 with three colors of red, green, and blue is controlled to emit red light 13, which is converted into collimated polarized light through action of a coupling lampshade 10, and enters the first substrate 1 to propagate in a totally reflected manner in the first substrate 1. When the red light 13 meets the light extracting grating 3, according to the light extracting efficiency of the light extracting grating 3, a part of the light is extracted into the liquid crystal layer 5 at a certain angle. Specifically, after the red light 13 is extracted by the light extracting grating 3, the red light 13 enters the liquid crystal layer 5. The electrical signals applied to the first electrode 4 and the second electrode 6 are controlled, so that the liquid crystal molecules in the liquid crystal layer are deflected, which can be equivalent to an oblique prism. In this way, the propagation direction of the red light 13 can be controlled. The liquid crystal layer may be divided into multiple independently controlled liquid crystal units. Each liquid crystal unit shown in FIG. 4 can be equivalent to an oblique prism structure shown in FIG. 5, where H is the height of the liquid crystal unit, P is the length of the liquid crystal unit, and n1-n4 are the refractive indexes of different parts of the liquid crystal unit. When different electric fields are applied to liquid crystal molecules in different regions, the deflection angles of the liquid crystal molecules are different, and the refractive indexes are also different. As a result, the entire optical path difference distribution is the same as the optical path difference distribution of the oblique prism, and its optical effect is equivalent to the oblique prism structure, which has a function of deflecting light angle.

As shown in FIG. 9, by controlling the electrical signals applied to the first electrode 4 and the second electrode 6, the propagation direction of the red light 13 is deflected, and the red light 13 irradiates the red filter unit 81, then the red light 13 may be emitted through the red filter unit 81 and enter the environment to realize bright state display of the red sub-pixel. By controlling the electrical signals applied to the first electrode 4 and the second electrode 6, the propagation direction of the red light 13 is deflected, and the red light 13 irradiates the green filter unit 82, then the red light 13 is absorbed the green filter unit 82, and no red light 13 is emitted in this case, which realizes dark state display of the red sub-pixel; similarly, by controlling the electrical signals applied to the first electrode 4 and the second electrode 6, the propagation direction of the red light 13 is deflected, and the red light 13 irradiates the blue filter unit 83, then the red light 13 is also absorbed by the blue filter unit 83, no red light 13 is emitted in this case, and dark state display of the red sub-pixel is realized.

When implementing the intermediate gray level display, by controlling the electrical signals applied to the first electrode 4 and the second electrode 6, part of the red light 13 irradiates the red filter unit 81, and part of the red light 13 irradiates the blue filter unit 83 and the green filter unit 82. The more the red light 13 irradiating the red filter unit 81 is, the greater the brightness of the red sub-pixel is.

The display process of the blue sub-pixel and the green sub-pixel uses the same display principle as the display process of the red sub-pixel, which is not repeated herein.

Figure 10:
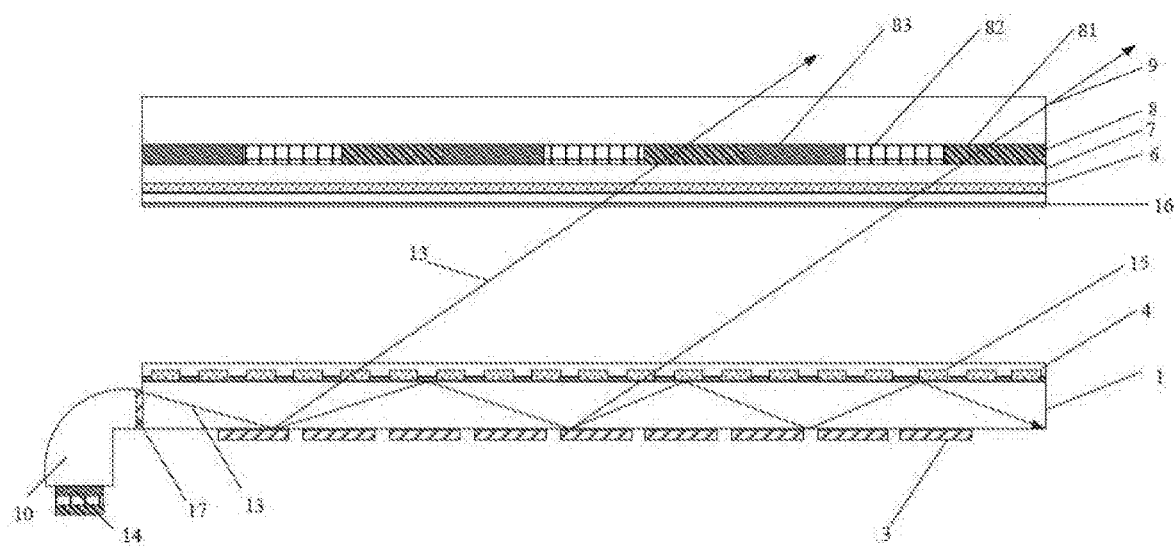
FIG. 10 is a schematic diagram of gray level display of a display device according to some embodiments of the present disclosure.

FIG. 10 is a schematic structural diagram of a display device in some embodiments of the present disclosure. As shown in FIG. 10, the display device includes a first substrate 1 and a second substrate 9. The light source 14 with three colors of red, green, and blue may sequentially emit red, green, and blue lights, which enter, via a coupling lampshade 10, the first substrate 1 in a collimated manner and propagates in a totally reflected manner in the first substrate 1. A polarizer 17 is provided on the light incident side of the first substrate 1 or the light exiting surface of the coupling lampshade 10 to convert light into polarized light. A light extracting grating 3 is provided on the opposite side of the light exiting side of the first substrate 1. Different from the light extracting grating 3 shown in FIG. 1, in this embodiment, only one type of light extracting grating is designed. The light extracting grating 3 may extract visible light with any color.

A first electrode 4 is provided on the first substrate 1, and the first electrode 4 may be a strip electrode; a filter layer 8 is provided on a surface of the second substrate 9 facing the first substrate 1, and the filter layer 8 includes a red filter unit 81, a green filter unit 82, and a blue filter unit 83; the second substrate 9 is further provided with a planarization layer 7 covering the filter layer 8, and the planarization layer 7 is used for flattening the step of the filter layer 8. A second electrode 6 is provided on the planarization layer 7, specifically, the second electrode 6 may be a planar electrode; in practical applications, a second alignment layer 16 is provided on a side of the second electrode 6 facing the first electrode 4, a first alignment layer 15 is provided on a side of the first electrode 4 facing the second electrode 6. A liquid crystal layer 5 is provided between the first electrode 4 and the second electrode 6. The upper and lower surfaces of the liquid crystal layer are aligned in parallel, so that the long axis direction of the liquid crystal molecules is parallel to the vibration direction of the polarized light. The liquid crystal molecules in the liquid crystal layer 5 may be deflected under the action of the electric field between the first electrode 4 and the second electrode 6.

Take the display of the red sub-pixel as an example for illustration. As shown in FIG. 10, the light source 14 with three colors of red, green, and blue is controlled to emit red light 13, which is converted into collimated polarized light through action of a coupling lampshade 10 and enters the first substrate 1 to propagate in a totally reflected manner in the first substrate 1. When the red light 13 meets the light extracting grating 3, according to the light extracting efficiency of the light extracting grating 3, a part of the light is extracted into the liquid crystal layer 5 at a certain angle. Specifically, after the red light 13 is extracted by the light extracting grating 3, the red light 13 enters the liquid crystal layer 5. The electrical signals applied to the first electrode 4 and the second electrode 6 are controlled, to enable the liquid crystal molecules in the liquid crystal layer to be deflected, which can be equivalent to an oblique prism, so that the propagation direction of the red light 13 may be controlled. The liquid crystal layer may be divided into multiple independently controlled liquid crystal units. Each liquid crystal unit shown in FIG. 4 can be equivalent to an oblique prism structure shown in FIG. 5, where H is the height of the liquid crystal unit, P is the length of the liquid crystal unit, and n1-n4 are the refractive indexes of different parts of the liquid crystal unit. When different electric fields are applied to liquid crystal molecules in different regions, the deflection angles of the liquid crystal molecules are different, and the refractive indexes are also different. As a result, the entire optical path difference distribution is the same as the optical path difference distribution of the oblique prism, and its optical effect is equivalent to the oblique prism structure, which has the function of deflecting light angle.

As shown in FIG. 10, by controlling the electrical signals applied to the first electrode 4 and the second electrode 6, the propagation direction of the red light 13 is deflected, and the red light 13 irradiates the red filter unit 81, then the red light 13 may be emitted through the red filter unit 81 and enter the environment to realize bright state display of the red sub-pixel. By controlling the electrical signals applied to the first electrode 4 and the second electrode 6, the propagation direction of the red light 13 is deflected, and the red light 13 irradiates the green filter unit 82, then the red light 13 is absorbed by the green filter unit 82, and no red light 13 is emitted in this case, which realizes dark state display of the red sub-pixel; similarly, by controlling the electrical signals applied to the first electrode 4 and the second electrode 6, the propagation direction of the red light 13 is deflected, and the red light 13 irradiates the blue filter unit 83, then the red light 13 is also absorbed by the blue filter unit 83, no red light 13 is emitted in this case, and dark state display of the red sub-pixel is realized.

When implementing the intermediate gray level display, by controlling the electrical signals applied to the first electrode 4 and the second electrode 6, part of the red light 13 irradiates the red filter unit 81, and part of the red light 13 irradiates the blue filter unit 83 and the green filter unit 82. The more the red light 13 irradiating the red filter unit 81 is, the greater the brightness of the red sub-pixel is.

The display process of the blue sub-pixel and the green sub-pixel uses the same display principle as the display process of the red sub-pixel, which is not repeated herein.

Sine the light source 14 with three colors of red, green, and blue in the embodiment emit red, green, and blue light in sequence, the display time period of a frame is divided into three stages, and display of the red sub-pixel, the blue sub-pixel and the green sub-pixel are respectively performed. Therefore, the refresh frequency of the display device needs to be tripled.

Some embodiments of the present disclosure also provide an operating method for a display device, which is applied to the display device as described above. The operating method includes:

applying electrical signals to the first electrode and the second electrode, so that the liquid crystal molecules are deflected, and a propagation direction of the polarized light extracted by the light extracting component is changed.

In some embodiments of the present disclosure, the light extracting component is used to extract the polarized light that is propagated in a totally reflected manner in the first substrate, and the electric field between the first electrode and the second electrode is controlled to enable the liquid crystal molecules to be deflected so as to control the propagation direction of the polarized light extracted by the light extracting component. When the extracted polarized light irradiates the color filter unit with the same color as the polarized light, gray level display is realized; and when the extracted polarized light irradiates the color filter unit with a color which is different from the color of the polarized light, dark state display is realized.

In some embodiments of the present disclosure, the light extracting component includes: a first light extracting grating capable of extracting first monochromatic light propagating in a totally reflected manner in the first substrate; a second light extracting grating capable of extracting second monochromatic light propagating in a totally reflected manner in the substrate; and a third light extracting grating capable of extracting third monochromatic light propagating in a totally reflected manner in the rust substrate; the first light extracting grating, the second light extracting grating and the third light extracting grating have different periods. The first monochromatic light, the second monochromatic light, and the third monochromatic light can be mixed into white light. The light source is a white light source. The operating methods include:

applying the electrical signals on the first electrode and the second electrode to deflect the liquid crystal molecules so as to change a propagation direction of the first monochromatic light extracted by the first light extracting grating;

applying the electrical signals on the first electrode and the second electrode to deflect the liquid crystal molecules so as to change a propagation direction of the second monochromatic light extracted by the second light extracting grating; and applying the electrical signals to the first electrode and the second electrode to deflect the liquid crystal molecules so as to change a propagation direction of the third monochromatic light extracted by the third light extracting grating.

When the polarized light of white light propagates in a totally reflected manner in the first substrate, the first monochromatic light is extracted using the first light extracting grating, and the electric field between the first electrode and the second electrode is controlled so that the liquid crystal molecules are deflected to control the propagation direction of the first monochromatic light. When the first monochromatic light irradiates the color filter unit of the first color, gray level display of the first color sub-pixel is realized. When the first monochromatic light irradiates the color filter unit of another color, dark state display of the first color sub-pixel is realized, where the color of the first monochromatic light is the first color;

When the polarized light of white light propagates in a totally reflected manner in the first substrate, the second monochromatic light is extracted using the second light extracting grating, and the electric field between the first electrode and the second electrode is controlled so that the liquid crystal molecules are deflected to control the propagation direction of the second monochromatic light. When the second monochromatic light irradiates the color filter unit of the second color, gray level display of the second color sub-pixel is realized. When the second monochromatic light irradiates the color filter unit of another color, dark state display of the second color sub-pixel is realized, where the color of the second monochromatic light is the second color;

When the polarized light of white light propagates in a totally reflected manner in the first substrate, the third monochromatic light is extracted by using the third light extracting grating, and the electric field between the first electrode and the second electrode is controlled so that the liquid crystal molecules are deflected to control the propagation direction of the third monochromatic light. When the third monochromatic light irradiates the color filter unit of the third color, gray level display of the third color sub-pixel is realized. When the third monochromatic light irradiates the color filter unit of another color, dark state display of the third color sub-pixel is realized, where the color of the third monochromatic light is the third color.

In some embodiments of the present disclosure, the light extracting component includes a fourth light extracting grating capable of extracting the first, second, and third monochromatic lights that are propagated in a totally reflected manner in the first substrate. The first monochromatic light, the second monochromatic light, and the third monochromatic light can be mixed into white light, and the light source sequentially emits the first monochromatic light, the second monochromatic light, and the third monochromatic light. The first monochromatic light, the second monochromatic light, and the third monochromatic light can be mixed into white light, and the operating method includes:

in a first stage of each display time period, controlling the light source to emit the first monochromatic light, and applying electrical signals to the first electrode and the second electrode, so that the liquid crystal molecules are deflected, and a propagation direction of the first monochromatic light extracted by the fourth light extracting grating is changed;

in a second stage of each display time period, controlling the light source to emit the second monochromatic light, and applying electrical signals to the first electrode and the second electrode, so that the liquid crystal molecules are deflected, and a propagation direction of the second monochromatic light extracted by the fourth light extracting grating is changed; and in a third stage of each display time period, controlling the light source to emit the third monochromatic light, and applying electrical signals to the first electrode and the second electrode, so that the liquid crystal molecules are deflected, and a propagation direction of the third monochromatic light extracted by the fourth light extracting grating is changed.

In some embodiments of the present disclosure, in the first stage of each display time period, the light source is controlled to emit the first monochromatic light, and when the polarized light of the first monochromatic light propagates in a totally reflected manner in the first substrate, the first monochromatic light is extracted using the fourth light extracting grating. The electric field between the first electrode and the second electrode is controlled so that the liquid crystal molecules are deflected to control the propagation direction of the first monochromatic light. When the first monochromatic light irradiates the color filter unit of the first color, gray level display of the first color sub-pixel is realized. When the first monochromatic light irradiates the color filter unit of another color, dark state display of the first color sub-pixel is realized, where the color of the first monochromatic light is the first color.

In the second stage of each display time period, the light source is controlled to emit the second monochromatic light, and when the polarized light of the second monochromatic light propagates in a totally reflected manner in the first substrate, the second monochromatic light is extracted using the fourth light extracting grating. The electric field between the first electrode and the second electrode is controlled so that the liquid crystal molecules are deflected to control the propagation direction of the second monochromatic light. When the second monochromatic light irradiates the color filter unit of the second color, gray level display of the second color sub-pixel is realized. When the second monochromatic light irradiates the color filter unit of another color, dark state display of the second color sub-pixel is realized, where the color of the second monochromatic light is the second color;

In the third stage of each display time period, the light source is controlled to emit the third monochromatic light, and when the polarized light of the third monochromatic light propagates in a totally reflected manner in the first substrate, the third monochromatic light is extracted by using the fourth light extracting grating. The electric field between the first electrode and the second electrode is controlled so that the liquid crystal molecules are deflected to control the propagation direction of the third monochromatic light. When the third monochromatic light irradiates the color filter unit of the third color, gray level display of the third color sub-pixel is realized. When the third monochromatic light irradiates the color filter unit of another color, dark state display of the third color sub-pixel is realized, where the color of the third monochromatic light is the third color.

Unless otherwise defined, technical terms or scientific terms used in the present disclosure shall have common meanings understood by those ordinary skilled in the art. Terms such as "first" and "second" in the present disclosure do not indicate any order, quantity or importance, and they are merely used to distinguish different components. Terms such as "include" or "contain" indicate that an element or object before such terms covers an element, an object or the equivalent enumerated after such terms, and do not exclude other elements and objects. Terus such as "coupled" and "connected" are not used to limit physical or mechanical connection, they may be direct or indirect electrical connection. Terms such as "above" "below", "left" and "right" are merely to describe relative position relationships, and if an absolute position of a described object changes, relative positions with respect to the described object may change correspondingly.

It can be understood that, if an element such as a layer, a film, a region or a substrate is described to be on or below another element, the element may be directly on or below the other element, or there may be an intermediate element between the element and the other element.

The above descriptions illustrate some implementations of the present disclosure. It should be noted that for those skill in the art, without departing from the principles of the present disclosure, various improvements and modifications can be made. These improvements and modifications shall fall within the protection scope of the present disclosure

What is claimed is:

1. A liquid crystal display panel, comprising:
   a first substrate and a second substrate opposite to each other, wherein the second substrate is on a light exiting side of the liquid crystal display panel;
   a first electrode, a second electrode, and a liquid crystal layer which are between the first substrate and the second substrate;
   a light extracting component on the first substrate, configured to extract polarized light that is propagated in a totally reflected manner in the first substrate; and
   a filter layer on the second substrate, comprising a color filter unit corresponding to a color, wherein the color filter unit is configured to transmit polarized light with the color and prevent transmission of polarized light with a color which is different from the color,
   wherein the first electrode and the second electrode are configured to control a deflection direction of liquid crystal molecules in the liquid crystal layer in response to electrical signals applied to the first electrode and the second electrode, to control a propagation direction of the polarized light extracted by the light extracting component.

2. The liquid crystal display panel according to claim 1, wherein the first electrode and the second electrode are configured to control the deflection direction of the liquid crystal molecules in the liquid crystal layer in response to voltage signals applied to the first electrode and the second electrode, so as to control the polarized light to propagate to the color filter unit with the corresponding color for realizing bright state display or to control the polarized light to propagate to the color filter unit with another color for realizing dark state display.

3. The liquid crystal display panel according to claim 1, wherein the light extracting component comprises:

a first light extracting grating configured to extract first monochromatic light that is propagated in a totally reflected manner in the first substrate;
a second light extracting grating configured to extract second monochromatic light that is propagated in a totally reflected manner in the first substrate; and
a third light extracting grating configured to extract third monochromatic light that is propagated in a totally reflected manner in the first substrate;
wherein the first light extracting grating, the second light extracting grating, and the third light extracting grating have different periods, and the first monochromatic light, the second monochromatic light, and the third monochromatic light are capable of being mixed into white light.

4. The liquid crystal display panel according to claim 3, wherein the filter layer comprises a first color sub-pixel configured to transmit the first monochromatic light, a second color sub-pixel configured to transmit the second monochromatic light, and a third color sub-pixel configured to transmit the third monochromatic light, the first light extracting grating corresponds to at least one first color sub-pixel, the second light extracting grating corresponds to at least one second color sub-pixel, and the third light extracting grating corresponds to at least one third color sub-pixel.

5. The liquid crystal display panel according to claim 1, wherein the light extracting component comprises:
   a fourth light extracting grating, configured to extract first monochromatic light, second monochromatic light, and third monochromatic light that are propagated in a totally reflected manner in the first substrate, wherein the first monochromatic light, the second first monochromatic light and the third monochromatic light are capable of being mixed into white light.

6. The liquid crystal display panel according to claim 1, further comprising:
   a first alignment layer on a side of the first substrate facing the second substrate; and
   a second alignment layer on a side of the second substrate facing the first substrate.

7. The liquid crystal display panel according to claim 1, wherein an orthographic projection of a long axis of liquid crystal molecules in the liquid crystal layer onto the first substrate is parallel to a vibration direction of the polarized light propagating in the liquid crystal layer.

8. The liquid crystal display panel according to claim 1, wherein the light extracting component is on a surface on a side of the first substrate close to the second substrate.

9. The liquid crystal display panel according to claim 1, wherein the light extracting component is on a surface on a side of the first substrate away from the second substrate.

10. The liquid crystal display panel according to claim 4, wherein the first color sub-pixel is configured to absorb the second monochromatic light and the third monochromatic light to prevent transmission of the second monochromatic light and the third monochromatic light;
   wherein the second color sub-pixel is configured to absorb the first monochromatic light and the third monochromatic light to prevent transmission of the first monochromatic light and the third monochromatic light; and
   wherein the third color sub-pixel is configured to absorb the first monochromatic light and the second monochromatic light to prevent transmission of the first monochromatic light and the second monochromatic light.

11. A display device, comprising:
the liquid crystal display panel according to claim 1;
a light source on a light incident side of the first substrate of the liquid crystal display panel; and
an optical coupling component, configured to convert light emitted by the light source into collimated polarized light, and enable the collimated polarized light to enter the first substrate at a preset angle, so that the polarized light propagates in the first substrate in a totally reflected manner.

12. The display device according to claim 11, wherein the optical coupling component comprises:
a coupling lampshade, configured to change a propagation direction of the light emitted by the light source, so that the light enters the first substrate at the preset angle to propagate in a totally reflected manner in the first substrate; and
a polarizer on a light exiting side of the coupling lampshade or the light incident side of the first substrate, configured to convert the light into the polarized light.

13. The display device according to claim 11, wherein the light source is a white light source.

14. The display device according to claim 11, wherein the light source comprises a first monochromatic light source, a second monochromatic light source, and a third monochromatic light source, the first monochromatic light source is configured to emit first monochromatic light, the second monochromatic light source is configured to emit second monochromatic light, the third monochromatic light source is configured to emit third monochromatic light, the first monochromatic light, the second monochromatic light, and the third monochromatic light are capable of being mixed into white light, and the light source is configured to sequentially emit the first monochromatic light, the second monochromatic light, and the third monochromatic light in three display time periods of a frame.

15. An operating method for a display device, applied to the display device according to claim 11, comprising:
applying electrical signals to the first electrode and the second electrode, so that the liquid crystal molecules are deflected, and a propagation direction of the polarized light extracted by the light extracting component is changed.

16. The operating method for the display device according to claim 15, wherein the light extracting component comprises:
a first light extracting grating configured to extract first monochromatic light that is propagated in a totally reflected manner in the first substrate;
a second light extracting grating configured to extract second monochromatic light that is propagated in a totally reflected manner in the first substrate;
a third light extracting grating configured to extract third monochromatic light that is propagated in a totally reflected manner in the first substrate; and
wherein the first light extracting grating, the second light extracting grating, and the third light extracting grating have different periods, the first monochromatic light, the second monochromatic light, and the third monochromatic light are capable of being mixed into white light, the light source is a white light source, and the operating method comprises:
applying the electrical signals to the first electrode and the second electrode to deflect the liquid crystal molecules so as to change a propagation direction of the first monochromatic light extracted by the first light extracting grating;
applying the electrical signals to the first electrode and the second electrode to deflect the liquid crystal molecules so as to change a propagation direction of the second monochromatic light extracted by the second light extracting grating; and
applying the electrical signals to the first electrode and the second electrode to deflect the liquid crystal molecules so as to change a propagation direction of the third monochromatic light extracted by the third light extracting grating.

17. The operating method for the display device according to claim 15, wherein the light extracting component comprises: a fourth light extracting grating, configured to extract first monochromatic light, second monochromatic and third monochromatic light which are propagated in a totally reflected manner in the first substrate, the first monochromatic light, the second monochromatic light, and the third monochromatic light are capable of being mixed into white light, the light source is configured to sequentially emit the first monochromatic light, the second monochromatic light, and the third monochromatic light, and the operating method comprises:
in a first stage of each display time period, controlling the light source to emit the first monochromatic light, and applying electrical signals to the first electrode and the second electrode, so that the liquid crystal molecules are deflected, and a propagation direction of the first monochromatic light extracted by the fourth light extracting grating is changed;
in a second stage of each display time period, controlling the light source to emit the second monochromatic light, and applying electrical signals to the first electrode and the second electrode, so that the liquid crystal molecules are deflected, and a propagation direction of the second monochromatic light extracted by the fourth light extracting grating is changed; and
in a third stage of each display time period, controlling the light source to emit the third monochromatic light, and applying electrical signals to the first electrode and the second electrode, so that the liquid crystal molecules are deflected, and a propagation direction of the third monochromatic light extracted by the fourth light extracting grating is changed.

18. The display device according to claim 11, wherein the first electrode and the second electrode are configured to control the deflection direction of the liquid crystal molecules in the liquid crystal layer in response to voltage signals applied to the first electrode and the second electrode, so as to control the polarized light to propagate to the color filter unit with the corresponding color for realizing bright state display or to control the polarized light to propagate to the color filter unit with another color for realizing dark state display.

19. The display device according to claim 11, wherein the light extracting component comprises:
a first light extracting grating configured to extract first monochromatic light that is propagated in a totally reflected manner in the first substrate;
a second light extracting grating configured to extract second monochromatic light that is propagated in a totally reflected manner in the first substrate; and
a third light extracting grating configured to extract third monochromatic light that is propagated in a totally reflected manner in the first substrate;
wherein the first light extracting grating, the second light extracting grating, and the third light extracting grating have different periods, and the first monochromatic light, the second monochromatic light, and the third monochromatic light are capable of being mixed into white light.

20. The display device according to claim 19, wherein the filter layer comprises a first color sub-pixel configured to transmit the first monochromatic light, a second color sub-pixel configured to transmit the second monochromatic light, and a third color sub-pixel configured to transmit the third monochromatic light, the list light extracting grating corresponds to at least one first color sub-pixel, the second light extracting grating corresponds to at least one second color sub-pixel, and the third light extracting grating corresponds to at least one third color sub-pixel.

* * * * *